Aug. 29, 1944.   W. E. PARKS   2,357,128
WORK HOLDER
Filed Nov. 22, 1943   2 Sheets-Sheet 2
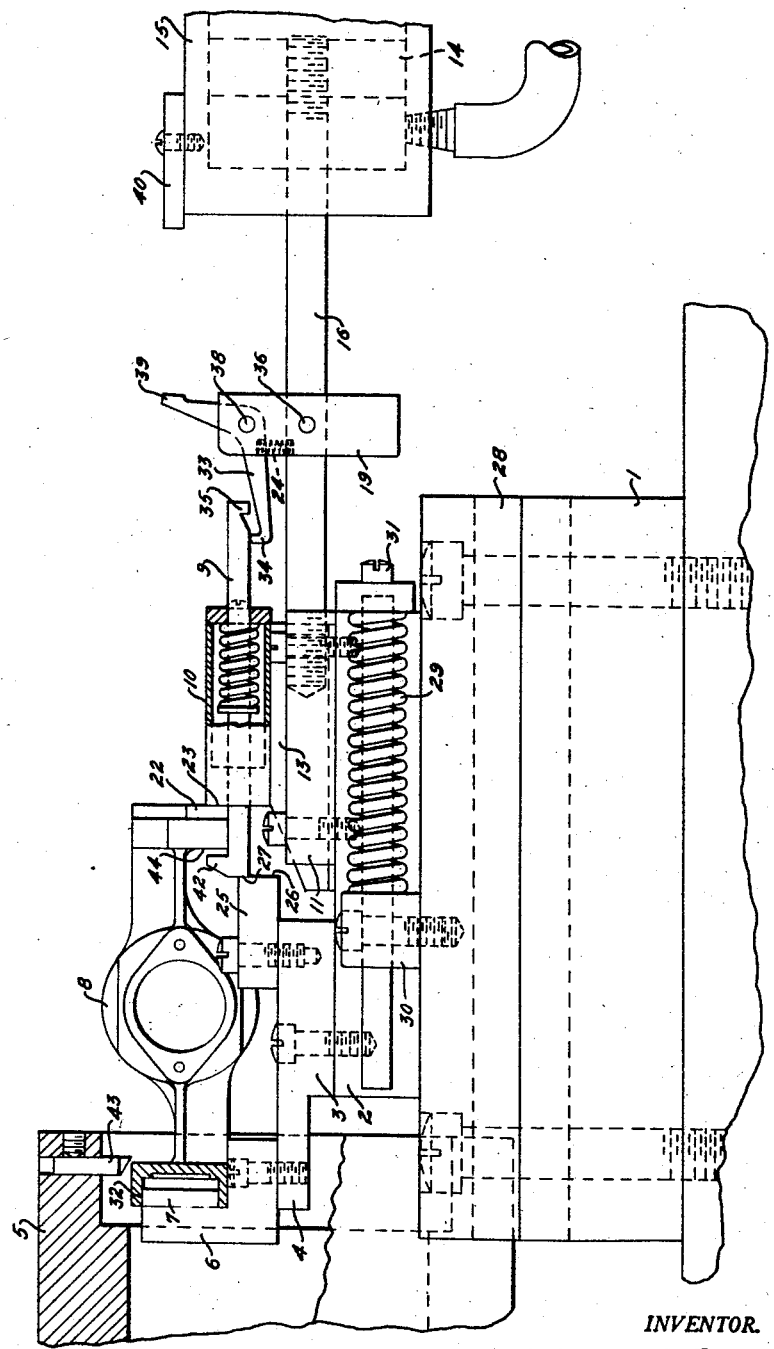
INVENTOR.
WESLEY E. PARKS
BY
Frank A. Harmon
ATTORNEY Patented Aug. 29, 1944

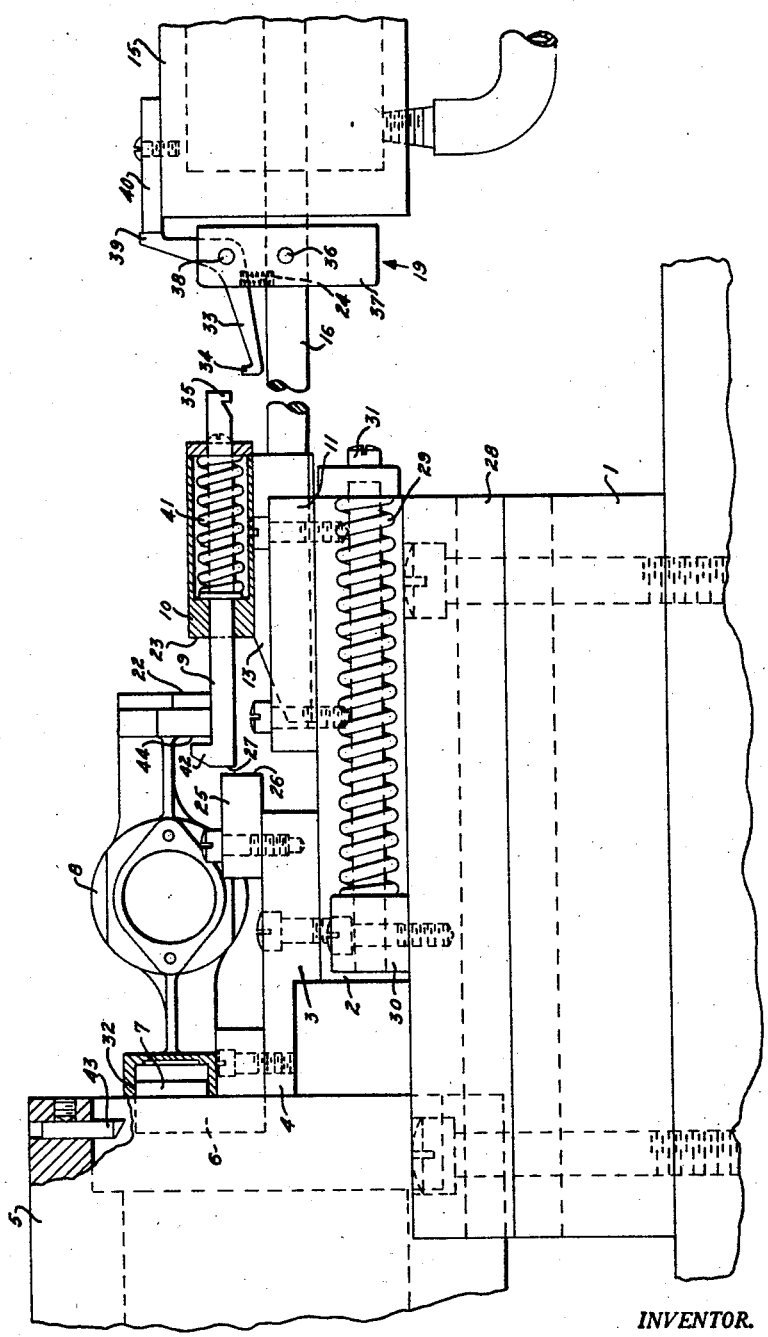

2,357,128

UNITED STATES PATENT OFFICE 2,357,128

WORK HOLDER

Wesley E. Parks, Bedford, Ohio, assignor, by mesne assignments, to Jack & Heintz, Inc., Cleveland, Ohio, a corporation of Ohio Application November 22, 1943, Serial No. 511,292

3 Claims. (Cl. 82—1)

This invention relates to a work holder and has for its general object to provide means to hold a piece of work firmly in a position for a machining operation as the work is moved past a cutting tool.

Another object of the invention is to provide in a work holder means to cause the firmly held work to be moved out of its machining position following a machining operation in order to facilitate the removal of the work from the holding device.

With the foregoing and other objects in view, the invention resides in the combination of parts and in the details of construction and operation hereinafter set forth in the following specification and appended claims, certain embodiments thereof being illustrated in the accompanying drawings in which:

Figure 1 is a view in side elevation of a work holder showing the work, in this particular case, a gyro gimbal, held in its initial position prior to a machining operation.

Figure 2 is a view in side elevation similar to Figure 1, but showing the gimbal fixedly clamped in position as it passes as rotating tool in a matching operation.

Referring more particularly to Figure 1, a base 1 is shown as slidably supporting section 2 of the work holder. Fixedly mounted to section 2 is a work table 3 having a long arm 4 extending slightly within a tool holder 5. Integral with the arm 4 at its extremity is an indexing stop 6 having a cylindrical boss 7 to fixedly hold and align a gimbal 8 in a position for machining.

The gimbal 8 as shown in Figure 1 is fixedly positioned by the boss 7 at its left end, while the right end rests freely on arm 9 of clamping table 10. The gimbal frame straddles work table 3 and does not contact it at any point.

In operation, a gimbal 8 is placed in a position as previously described and shown in Figure 1. A piston 14 in cylinder 15 is actuated by conventional means in order to force a piston rod 16 to emerge from cylinder 15. The piston rod 16 is integrally connected to the clamping table 10 in which is slidably dovetailed by flange 13 to portion 11 of the supporting section 2.

As the table 10 is moved to the left, surface 23 of the table contacts face 22 of the gimbal 8 thereby clamping the gimbal in a fixed position for the impending machining operation. Upon further movement of table 10, the force of driving piston 14 is transmitted through gimbal 8 to indexing stop 6. Since the stop 6 is integral with work table 3, which is fixedly connected to supporting section 2, the driving force of the piston 14 is further transmitted to section 2. As section 2 is slidably dovetailed to base 1 by flange 28, it will be moved to the left under the piston force previously mentioned.

A compression spring 29 having one end fixed by stud 30 to the base 1 and having the other end fixed to sliding section 2 by stud 31, is provided to oppose the movement of section 2 to the left in order to keep gimbal 8 tightly clamped between the limiting stop 6 and the table 10. This spring has a dual purpose in that it also moves section 2 to the right when a machining operation on the end of the gimbal is finished and piston 16 is retracted.

When the gimbal is clamped in position by the movement of table 10, a tight friction joint is formed between the surface of detent 32 in gimbal 8 and cylindrical indexing boss 7. Although it is relatively easy in production to place the gimbal in the machining position on the device, it is difficult to quickly remove the gimbal manually following the machining operation due to the frictional engagement just described. To automatically accomplish the release of the gimbal from its frictional engagement with boss 7, a spring actuated mechanism 19 is employed.

The mechanism 19 consists of a vertical arm 37, which is rigidly connected to piston rod 18 by rivet 36, an arm 33 pivotedly mounted by pin 38 to the vertical supporting arm 37, and a coil spring 24, connected to the pivoted arm 33 at a point to the left of pivot 38 and to the piston rod 16 at a point directly below its pivoted arm connection.

In Figure 1, foot 39 of arm 33 is shown bearing against stud 40 of cylinder 15. In this position, spring 24 is placed under compression. As the piston rod 16 emerges to the left in Figure 1, pivot arm 33 tends to rotate clockwise about pivot 38 under the action of spring 24, since foot 39 no longer contacts stop 40. The clockwise rotation of arm 33 is not enough, however, to keep foot 34 of arm 33 from sliding under foot 35 of arm 9 as the piston rod moves to the left.

Since the table 10 moves to the left in the initial stage of the operation as previously described, arm 9 which is slidably mounted under control of spring 41 in table 10, also moves to the left until its traverse is stopped by stop 25 which is fixed to table 3. Face 26 of stop 25 contacts face 27 of foot 42 prior to the clamping action of the table face 23 against gimbal face 22. This stopping action of stud 25 causes arm 9 to remain stationary temporarily compressing spring 41 as the table 10 is moved still further to the left by piston 14. Foot 34 of pivoted arm 33 contacts and then slides under and past foot 35 or arm 9 while arm 9 is in its stationary position.

The various elements of the device are now in the position shown in Figure 2.

When the machining operation of tool 43 in rotating tool holder 5 on the gimbal 8 is completed, automatic means is employed to cause the direction of traverse of position 14 to reverse. Work table 3 and section 2 move back to their position as in Figure 1 under action of spring 29, since the direction of the piston force formerly transmitted by gimbal 8 to table 3 and section 2 is reversed. When table 3 and section 2 reach their original position, foot 34 of arm 33 engages foot 35 of arm 9 under pressure of spring 24. As piston 14 is almost completely retracted to its original position as in Figure 1, pivoted arm 33 pulls arm 9 to the right against the restraining action of spring 41 as seen in Figure 5. Foot 42 of arm 9 engages flange 44 of the gimbal 8 and pulls the gimbal to the right, thereby dislodging the gimbal from its tight frictional engagement on boss 7. Following the action of loosening the gimbal 8, foot 39 of pivoted arm 33 contacts stop 40 on cylinder 15 as the piston is completely retracted. The arm 33 is caused to rotate counterclockwise about pivot 38, foot 34 is made to disengage foot 35 of arm 9, and spring 41 which has been under compression returns arm 9 with a snap to its position as shown in Figure 1.

The cycle is completed at this point, the gimbal is easily and quickly removed, and another gimbal may be inserted for a machining operation similar to the operation just described.

I claim:

1. A work holder comprising a base, a work table slidably mounted on said base, an indexing stop on said work table to hold and align one end of a piece of work for a machining operation, a second work table, slidably mounted on a portion of the first work table, to support the opposite end of the work, a piston operatively connected with the second work table by a piston rod to move the second work table parallel to the first table and thereby clamp the work in a fixed position for a machining operation, a compression spring fixedly attached to the base at one end and to the first work table at the other end to oppose the movement of said first work table caused by the transmission of forces from said piston rod and said second work table through the clamped work to the first work table, and to cause the first work table to remove the work from the path of a machining tool following a machining operation, and spring controlled hook arms, one integral with the second work table and one integral with the piston rod, to cause the work, upon their engagement, to be released from its frictional engagement with the indexing stop of the first work table following a machining operation.

2. In a work holder comprising a base, a work table slidably mounted on said base, and a second work table slidably mounted on a portion of the first work table, means integral with the first work table to frictionally engage and align one end of a piece of work for a machining operation, sliding hook arm means integral with the second work table to support the opposite end of said work, means for moving the second work table so as to clamp the work firmly between said friction engaging means of the first work table and said second work table, means responsive to the force transmitted from the motivating means of the second work table through the firmly held work to the first work table to cause said first work table to move so as to pass one end of the work through a machining operation, compression spring means between the first work table and the base to oppose movement of said table through the machining operation in order to maintain the firm engagement of the work and to return said table to its original position following a machining operation, pivoted hook arm means integral with the motivating means to engage the sliding hook arms means of the second work table upon the completion of a machining operation and retraction of said second work table, and means responsive to the engagement of the two hook arm means during the retraction of the second work table to cause the work to be pulled out of its tight frictional engagement with the first work table holding means in order to facilitate removal of the work from the work holder.

3. A work holder comprising a base, a first work table slidably mounted on said base, a second work table slidably mounted on the first work table, means for moving the second work table along a sliding track on the first work table, frictional abutment and indexing means on the first work table to hold and align one end of a piece of work, abutment means on the second work table to hold and to clamp the opposite end of the work as said motivating means moves the work holding means of the second work table toward the holding means on the first work table, spring means for opposing movement of the first work table along its sliding engagement with the base as the motivating force of the second work table is transmitted through the clamped work to the first work table, and means responsive to the reversal of direction of the motivating force means of the second work table to remove the work from the frictional abutment and indexing means on the first work table in order to facilitate the removal of the work from the work holder.

WESLEY E. PARKS.